United States Patent Office 3,390,731
Patented July 2, 1968

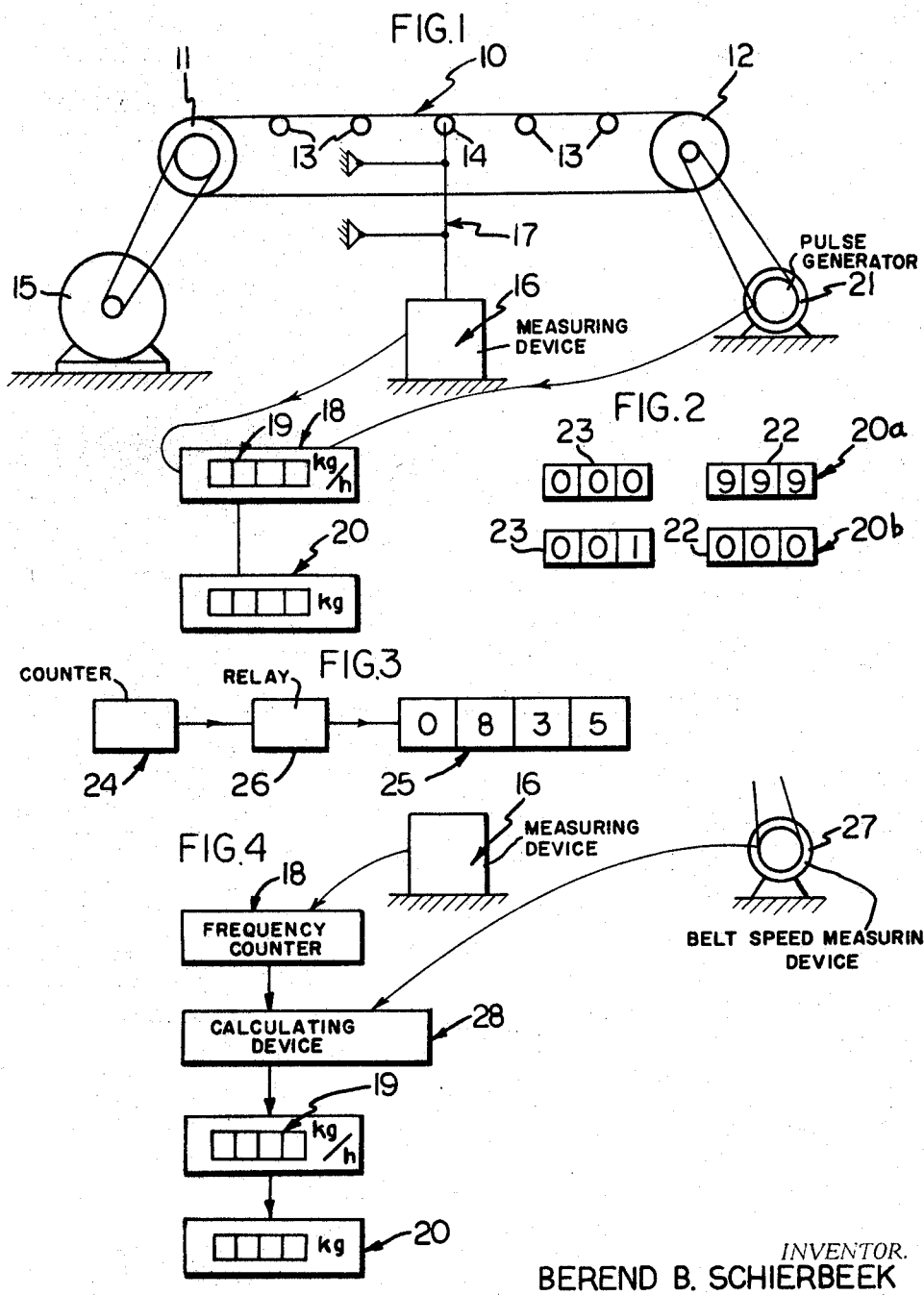

3,390,731
WEIGHING APPARATUS FOR BELT CONVEYOR
Berend B. Schierbeek, Leidschendam, Netherlands, assignor to Maatschappij Van Berkel's Patent N.V., Rotterdam, Netherlands, a limited-liability company of the Netherlands
Filed Mar. 17, 1966, Ser. No. 535,105
Claims priority, application Germany, Mar. 18, 1965, M 64,573
4 Claims. (Cl. 177—16)

ABSTRACT OF THE DISCLOSURE

Weighing apparatus for belt conveyer comprising a frequency measuring device that measures the weight periodically and divides by the number of periods to obtain the average for a given period of time and including a belt speed compensator.

---

This invention relates in general to a weighing apparatus or scale for a belt conveyer, and more particularly to a weighing apparatus generating frequencies in response to a weight measurement to operate counting mechanisms, although other uses and purposes may be apparent to one skilled in the art.

Heretofore known belt conveyer scales have been of the type that would generate voltages in accordance with the weight measured, and convert the voltages into pulses of a frequency. Other scales have included a mechanical integrator which responds to a belt deflection value and belt speed but have not proved satisfactory because of poor accuracy. Further, there have been electrically integrating scales responsive to the turning rate of electric counters or motors where the turning rate is proportional to a voltage dependent upon scale deflection and belt speed. However, these scales have been incapable of operating accurately because the counters operate approximately proportionately within a certain range and the measuring elements, particularly potentiometers, have inaccuracies.

Adding conveyer belt scales where the measuring value is taken intermittently from the belt are somewhat better since the measuring values read and the adding can be accomplished substantially without contact with the scale. However, difficulty is encountered in that the cycle time for taking the measuring value and adding must be at least equal to or smaller than the oscillation time of the scale thereby requiring very high counting speeds.

It is therefore an object of the present invention to provide a new and improved weighing apparatus for a belt conveyer that obviates the above named difficulties and provides more accurate weighing.

The weighing apparatus of the present invention is capable of indicating the totally conveyed weight of material, and the weight rate of material being conveyed at any time; and includes generally a scale measuring the physical magnitude of material weight on the belt and means for converting the physical magnitude digitally into electrical pulses having a frequency dependent on the measured weight. A frequency counter responds to the frequency. This type of weighing apparatus, connected with a suitable mechanism coacting with a roller under the belt permits the roller to move only slightly in a vertical direction. Any known means may be provided for converting the physical magnitude measurement into a frequency, such as a piezoelectric crystal or vibrating strings or wires. A pulse generator driven by the belt and thereby responding to belt speed is utilized to obtain the total conveyed weight measurement and starts the frequency counting. The frequency measurement requires a period of time, while fluctuations in the physical magnitude weight measurement are instantaneous. The speed of the pulse generator is such that a predetermined short time after the termination of a frequency counting, another begins. Further, any slip in the belt drive is compensated for by the pulse generator. The belt speed can also be utilized so that the result of the frequency counter is multiplied digitally by a number proportional to belt speed, and the frequency counter is always started at equal time intervals.

The weight of the total conveyed amount of material is indicated by a second counter which counts the pulses counted by the frequency counter but is not reset to zero. This counter includes electronic and mechanical counting elements, wherein the mechanical counter responds to a predetermined number of pulses in the electronic counter thereby defining the electronic counter as a frequency divider.

Another object of this invention is to provide a weighing apparatus for a belt conveyer capable of indicating total conveyed weight of material and the weight rate of material at any time.

Still another object of this invention is in the provision of a weighing apparatus for a belt conveyer that converts a physical weight measurement into electrical pulses of a frequency dependent upon the weight.

Other objects, features and advantages of the invention will be apparent from the following detailed disclosure, taken in conjunction with the accompanying sheet of drawing, wherein like reference numerals refer to like parts, in which:

FIG. 1 is a diagrammatic view of a belt conveyer having a weighing apparatus according to the present invention;

FIG. 2 is a diagrammatic view of a two part counter according to the present invention;

FIG. 3 is a diagrammatic view of a counter and indicator according to the present invention; and FIG. 4 is a diagrammatic view of a modification of the invention.

Referring now to the drawings and particularly to FIG. 1, an endless conveyer belt 10 is shown trained about longitudinally spaced pulleys 11 and 12. The upper run of the belt is supported by fixed rollers 13 and a movable roller 14. The movable roller 14 is mounted so that it is capable of only slight movement in the vertical direction, in comparison to a belt scale with an inclination weight device. A motor 15 is drivingly connected to the pulley 11 to drive the belt 10. A measuring device or scale 16 is interconnected by a lever arrangement 17 to the movable roller 14 and therefore responsive thereto. Thus, the measuring device senses the physical magnitude of the weight of material on the belt 10 since the weight of material on the belt causes corresponding movement of the roller 14.

The measuring device 16 also includes means for converting the physical magnitude weight measurement into electrical pulses having a frequency dependent upon the sensed weight. Any known device may be employed for converting the weight measurement into a frequency, such as a piezoelectric crystal or vibrating strings, or electrodynamically by immersion coils. In the former, there may be provided two strings each of which is provided with an excitor and a receiver, wherein the excitors and receivers are coupled with one another so that on change of frequency of the strings the excitors excite the strings with a new frequency. The excitors and receivers operate through amplifiers and an interference current circuit and an electronic calculating apparatus the result of which is indicated in a counter. The electrodynamic conversion can take place through comparison with the current of a pulse generator, so that the pulses are proportional to the weight and are counted at time intervals.

A frequency counter 18 receives and counts the frequency delivered by the converting means of the measurement device 16, and may also include an indicator 19 to indicate the weight rate of material being conveyed at all times. For example, the indicator 19 may be calibrated in any desirable manner, such as to indicate the kilograms or pounds of material per hour.

A second counter 20 responds to the counter 18 to indicate the accumulative total weight of material conveyed in kilograms, pounds or any desired weight unit. The counter 20 counts the pulses counted by the counter 18, and is not reset to zero. The belt speed is considered by the counter 20 by a pulse generator 21 that is drivingly connected to the pulley 12 and therefore responsive to the belt speed. The pulse generator 21 starts the frequency counting and is interconnected to said converting means so that a successive counting begins a predetermined time period after each preceding counting is terminated. This time period need only be such that changes in the slip of the motor and belt can be considered.

The counter 20 includes an electronic counting unit or frequency divider 22 and a mechanical counting unit 23, the lower decades constituting the electronic unit and the upper decades constituting the mechanical unit. The operation of the mechanical unit is accomplished by the transfer from the highest decade of the electronic unit when the 9 passes to 0. For example, FIG. 2 shows the shift from 999 in the counter 20a to 1000 in the counter 20b. It should be appreciated that the electronic unit could be calibrated to shift the mechanical unit one step after any number of pulses in the electronic unit, such as 3600.

If the frequency counting required one second, it would be possible to make 3600 measurements per hour, whereby 3600 measurements would be added in one hour and the frequency divider 22 would have to divide by 3600 to obtain the total conveyed weight.

Where it is desired to compensate for the slip of the drive motor, such can be accomplished by the frequency divider. For example, if the motor 15 has a speed of 1500 r.p.m., it would be normally necessary to have the pulse generator 21 deliver a start pulse for a frequency counting every 25 revolutions of the motor. If the slip is about 5%, such would be considered in the total weight counter 20, whereby the frequency divider would divide by about 3400 instead of 3600. Thus the total weight would be calibrated to a motor speed of $34/36 \times 1500 = 1420$ r.p.m. If the frequency counting takes a longer or shorter time, the speed of the pulse generator 21 and the presetting of the frequency divider 22 must be changed accordingly.

It should be further appreciated that the present invention could be employed with or without indication, and so that the total indication of the counter 20 is not continually changing, any known mechanism may be employed to cause the indication to hold. For example, FIG. 3 shows an arrangement including a counter 24 and an indicator 25 having a memory or holding relay means 26 therebetween to cause the indication to stand until the counter has completed a new counting.

The belt speed may be included whereby the counter information is digitally multiplied by a number proportional to belt speed. The frequency counter 18 can then be started at equal time intervals and this time interval may be chosen so that monitoring of the weight variations is nearly constant. In the embodiment of FIG. 4, a digital belt speed measuring device 27 drivingly connected to the belt and therefore responsive to belt speed sends its signal to a calculating device 28 which multiplies the result of each frequency counting by the result of the digital belt speed measuring device.

It will be understood that modifications and variations may be effected without departing from the scope of the novel concepts of the present invention, but it is understood that this application is to be limited only by the scope of the appended claims.

The invention is hereby claimed as follows:

1. Apparatus for weighing material carried on a moving belt of a belt conveyor comprising, a measuring device having means in engagement with said belt for sensing the physical magnitude of the weight of the material on the belt and means responding to said sensing means and converting said physical magnitude digitally into electrical pulses having a frequency, a frequency counter responding to the frequency of said converting means to continually indicate the material weight being carried by the belt, a pulse generator driven by the belt and responding to the belt speed, and a second counter responsive to the pulses of said frequency counter and said pulse generator to indicate the total accumulative weight of material carried by said belt, said second counter including an electronic counting unit responsive to pulses of the frequency counter and a mechanical counting unit responsive to a predetermined number of pulses from said electronic counting unit, said electronic counting unit defining a frequency divider that provides an average value for a given period of time and said mechanical counting unit defining an indicator.

2. An apparatus as defined in claim 1, wherein means is provided between said indicator and said second counter to retain the indication.

3. Apparatus for weighing material carried on a moving belt of a belt conveyor comprising, a measuring device having means in engagement with said belt for sensing the physical magnitude of the weight of the material on the belt and means responding to said sensing means and converting said physical magnitude digitally into electrical pulses having a frequency, a frequency counter responding to the frequency of said converting means to continually indicate the material weight being carried by the belt, a pulse generator driven by the belt and responding to the belt speed, and a second counter responsive to the pulses of said frequency counter and said pulse generator to indicate the total accumulative weight of material carried by said belt, and means is provided to digitally multiply the result of the frequency counter by a number proportional to the belt speed.

4. Apparatus as defined in claim 3, wherein means is provided to multiply the result of each frequency counting by the result of a digital belt speed measuring device.

References Cited
UNITED STATES PATENTS

| 3,139,578 | 6/1964 | Henderson et al. | |
| 3,324,962 | 6/1967 | Morrison | 177—210 |
| 3,332,506 | 7/1967 | Bradfield | 177—210 |

RICHARD B. WILKINSON, *Primary Examiner.*

GEORGE H. MILLER, JR., *Assistant Examiner.*